L. S. Mason.
Horse Hay-Fork.
No. 74106. Patented Feb. 4, 1868.
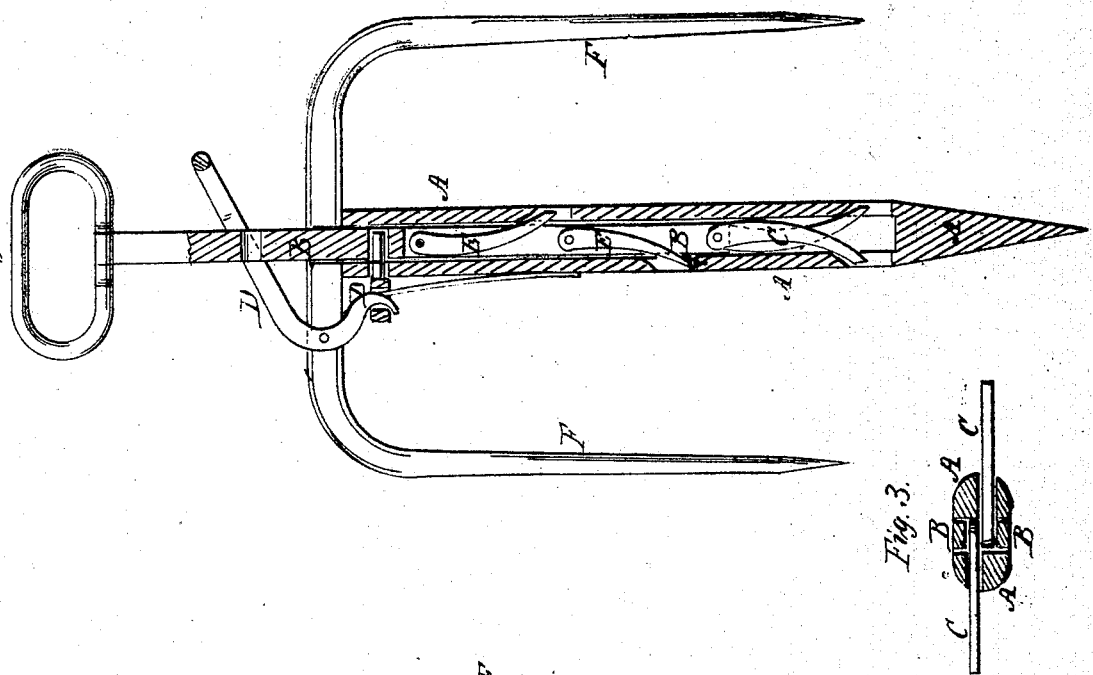
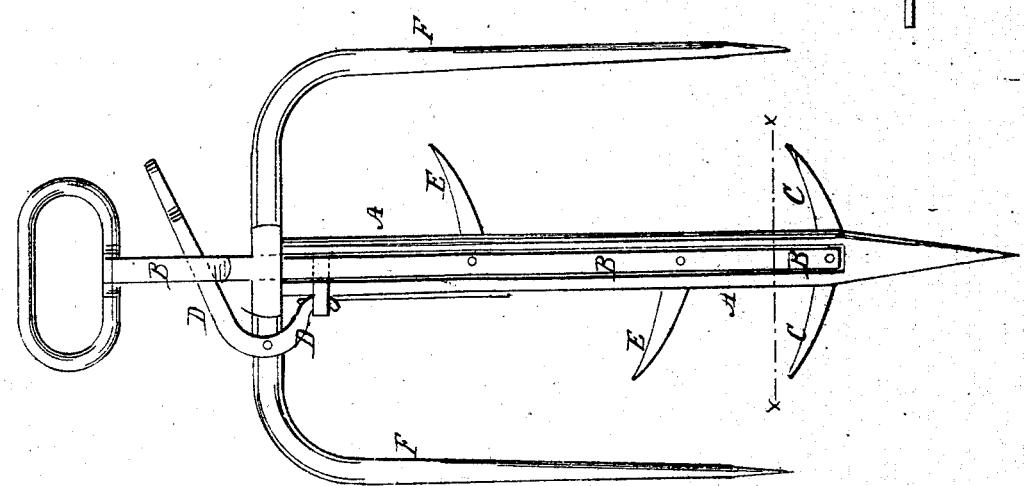
Witnesses.
Theo Tusche
J. A. Fraser
Inventor.
L. S. Mason
Per Munn & Co.
Attorneys

United States Patent Office.

LINUS S. MASON, OF MIDDLEFIELD CENTRE, NEW YORK.

Letters Patent No. 74,106, dated February 4, 1868.

IMPROVEMENT IN HORSE HAY-FORKS.

The Schedule referred to in these Letters Patent and making part of the same.

TO ALL WHOM IT MAY CONCERN:

Be it known that I, L. S. MASON, of Middlefield Centre, in the county of Otsego, and State of New York, have invented a new and improved Horse Hay-Fork; and I do hereby declare that the following is a full, clear, and exact description thereof, which will enable others skilled in the art to make and use the same, reference being had to the accompanying drawings, forming part of this specification.

Figure 1 represents a side view of my improved hay-fork.

Figure 2 is a similar view, partly in section, of the same.

Figure 3 is a detail horizontal sectional view of the same, the plane of section being indicated by the line $x\ x$, fig. 1.

Similar letters of reference indicate corresponding parts.

This invention relates to a new harpoon hay-fork, which is provided with tines projecting from the sides of its shank, so that the hay, straw, or grain will be prevented from slipping on the shank.

The great objection to harpoon-forks has always been the small amount of bearing provided in the same for the hay or straw. The two tines which are provided on the lower end of the shank are insufficient to support and hold a load of hay or straw, which will slip off, and only a small quantity, resting directly on the tines, will be elevated. Especially for the hoisting of straight-grain straw are these harpoon-forks inoperative.

To avoid these difficulties, I have provided the arm, which slides in the shank of the fork, and which operates the ordinary lower tines, with tines on the sides, so that support will be provided for the straw or hay along the whole length of the shank.

A represents the slotted tubular or hollow shank of a harpoon hay-fork. B is a bar, sliding in the same, carrying the ordinary lower tines $c\ c$, and operating them in the shank or tube A, as usual. D is a spring-catch, for locking the bar B in its upper and lower positions. The construction of the bar B, tines C, and catch D may be varied at pleasure, and does not form part of my invention. To the sides of the bar B is pivoted, at suitable intervals from each other, a series of tines, E E, as shown in fig. 2, which project through holes arranged in one or more of the sides of the shank A, when the bar B is pushed down, as in fig. 1.

Thus a series of tines is made to project from the shank of harpoon-forks. The efficiency of the fork will still be increased if it is provided with pointed guards F F on the sides, as shown, or with a pointed head.

I claim as new, and desire to secure by Letters Patent—

1. The tines E E, which project from one or more of the sides of the shank of a harpoon hay-fork above the ordinary harpoons C, and which can be drawn in and out at will, substantially as herein shown and described.

2. A harpoon hay-fork, when provided with tines E E on the sides of its shank, and with pointed side guards F F, all made and operating substantially as herein shown and described.

LINUS S. MASON.

Witnesses:
 EDWIN R. TRIPP,
 C. H. BURNS.